United States Patent [19]
Murphy et al.

[11] Patent Number: 5,460,705
[45] Date of Patent: Oct. 24, 1995

[54] METHOD AND APPARATUS FOR ELECTROCHEMICAL PRODUCTION OF OZONE

[75] Inventors: Oliver J. Murphy; G. Duncan Hitchens, both of Bryan, Tex.

[73] Assignee: Lynntech, Inc., College Station, Tex.

[21] Appl. No.: 91,752

[22] Filed: Jul. 13, 1993

[51] Int. Cl.⁶ .................................................... C25B 9/00
[52] U.S. Cl. .................. 204/252; 204/255; 204/256; 204/257; 204/258; 204/283; 204/290 R; 204/290 F
[58] Field of Search .................. 204/254, 255, 204/256, 282, 283, 290 R, 290 F, 252, 257, 258; 429/42; C25B 9/00, 11/04

[56] References Cited

U.S. PATENT DOCUMENTS

| | | | |
|---|---|---|---|
| 4,214,969 | 7/1980 | Lawrance | 204/255 |
| 4,927,800 | 5/1990 | Nishiki et al. | 204/282 |
| 4,992,126 | 2/1991 | Door | 204/283 |

*Primary Examiner*—Kathryn Gorgos
*Attorney, Agent, or Firm*—Jeffrey L. Streets; Gunn & Associates

[57] ABSTRACT

An electrolytic cell for the production of ozone utilizing an anodic electrocatalyst and a membrane and electrode assembly formed by bonding a polytetrafluoroethylene-containing, proton exchange polymer-impregnated, gas diffusion cathode to a proton exchange membrane.

10 Claims, 6 Drawing Sheets

METHOD AND APPARATUS FOR ELECTROCHEMICAL PRODUCTION OF OZONE

It is to be noted that the U.S. government may have rights in the subject matter disclosed and claimed herein.

BACKGROUND OF THE INVENTION

This invention relates generally to improvements in the production of ozone ($O_3$). More particularly, the invention relates to the electrolytic production of ozone utilizing a proton exchange membrane to separate the anode and depolarized cathode.

Ozone has long been recognized as a useful chemical commodity valued particularly for its outstanding oxidative activity. Because of this activity, it finds wide application in disinfection processes. In fact, it kills bacteria more rapidly than chlorine, it decomposes organic molecules, and removes coloration in aqueous systems. Ozonation removes cyanides, phenols, iron, maganese, and detergents. It controls slime formation in aqueous systems, yet maintains a high oxygen content in the system. Unlike chlorination, which may leave undesirable chlorinated organic residues in organic containing systems, ozonation leaves fewer potentially harmful residues. There is evidence that ozone will destroy viruses. It is used for sterilization in the brewing industry and for odor control in sewage treatment and manufacturing. And ozone is employed as a raw material in the manufacture of certain organic compounds, e.g., oleic acid and peroxyacetic acid.

Thus, ozone has widespread application in many diverse activities, and its use would undoubtedly expand if its cost of production could be reduced. In addition, since ozone is explosive when concentrated as either a gas or liquid, or when dissolved into solvents or absorbed into gels, its transportation is potentially hazardous. Therefore, it is generally manufactured on the site where it is used. However, the cost of generating equipment, and poor energy efficiency of production has deterred its use in many applications and in many locations.

On a commercial basis, ozone is currently produced by the silent electric discharge process, otherwise known as corona discharge, wherein air or oxygen is passed through an intense, high frequency alternating current electric field. The corona discharge process forms ozone through the following reaction:

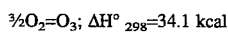

Yields in the corona discharge process generally are in the vicinity of 2% ozone, i.e., the exit gas may be about 2% $O_3$ by weight. Such $O_3$ concentrations, while quite poor, in an absolute sense, are still sufficiently high to furnish usable quantities of $O_3$ for the indicated commercial purposes. Another disadvantage of the corona process is the production of harmful $NO_x$, otherwise known as nitrogen oxides. Other than the aforementioned electric discharge process, there is no other commercially exploited process for producing large quantities of $O_3$.

However, $O_3$ may also be produced by the electrolytic process, wherein an electric current (normally D.C.) is impressed across electrodes immersed in an electrolyte, i.e., electrically conducting, fluid. The electrolyte includes water, which, in the process, dissociates into its respective elemental species, $O_2$ and $H_2$. Under the proper conditions, the oxygen is also evolved as the $O_3$ species. The evolution of $O_3$ may be represented as:

It will be noted that the $\Delta H°$ in the electrolytic process is many times greater than that for the electric discharge process. Thus, the electrolytic process appears to be at about a six-fold disadvantage.

More specifically, to compete on an energy cost basis with the electric discharge method, an electrolytic process must yield at least a six-fold increase in ozone. Heretofore, the necessary high yields have not been realized in any foreseeably practical electrolytic system.

The evolution of $O_3$ by electrolysis of various electrolytes has been known for well over 100 years. High yields up to 35% current efficiency have been noted in the literature. Current efficiency is a measure of ozone production relative to oxygen production for given inputs of electrical current, i.e., 35% current efficiency means that under the conditions stated, the $O_2/O3$ gases evolved at the anode are comprised of 35% $O_3$ by volume. However, such yields could only be achieved utilizing very low electrolyte temperatures, e.g., in the range from about −30° C. to about −65° C. Maintaining the necessary low temperatures, obviously requires costly refrigeration equipment as well as the attendant additional energy cost of operation.

Ozone, $O_3$, is present in large quantities in the upper atmosphere in the earth to protect the earth from the suns harmful ultraviolet rays. In addition, ozone has been used in various chemical processes, is known to be a strong oxidant, having an oxidation potential of 2.07 volts. This potential makes it the fourth strongest oxidizing chemical known.

Because ozone has such a strong oxidation potential, it has a very short half-life. For example, ozone which has been solubilized in waste water may decompose in a matter of 20 minutes. Ozone can decompose into secondary oxidants such as highly reactive hydroxyl (OH*) and peroxyl (HO$_2$*) radicals. These radicals are among the most reactive oxidizing species known. They undergo fast, non-selective, free radical reactions with dissolved compounds. Hydroxyl radicals have an oxidation potential of 2.8 volts (V), which is higher than most chemical oxidizing species including $O_3$. Most of the OH* radicals are produced in chain reactions where OH itself or HO$_2$* act as initiators.

Hydroxyl radicals act on organic contaminants either by hydrogen abstraction or by hydrogen addition to a double bond, the resulting radicals disproportionate or combine with each other forming many types of intermediates which react further to produce peroxides, aldehydes and hydrogen peroxide.

Electrochemical cells in which a chemical reaction is forced by added electrical energy are called electrolytic cells. Central to the operation of any cell is the occurrence of oxidation and reduction reactions which produce or consume electrons. These reactions take place at electrode/solution interfaces, where the electrodes must be good electronic conductors. In operation, a cell is connected to an external load or to an external voltage source, and electric charge is transferred by electrons between the anode and the cathode through the external circuit. To complete the electric circuit through the cell, an additional mechanism must exist for internal charge transfer. This is provided by one or more electrolytes, which support charge transfer by ionic conduction. Electrolytes must be poor electronic conductors to prevent internal short circuiting of the cell.

The simplest electrochemical cell consists of at least two electrodes and one or more electrolytes. The electrode at which the electron producing oxidation reaction occurs is the anode. The electrode at which an electron consuming reduction reaction occurs is called the cathode. The direction of the electron flow in the external circuit is always from anode to cathode.

A typical electrochemical cell will have a positively charged anode and a negatively charged cathode. The anode and cathode are typically submerged in a liquid electrolytic solution which may be comprised of water and certain salts, acids or base materials. Generally speaking, gaseous oxygen is released at the anode surface while gaseous hydrogen is released at the cathode surface. A catalyst such as lead dioxide may be used to coat the anode to get greater ozone production. The anode substrate may be another material such as titanium, graphite, or the like.

The cathode and anode are positioned within the electrolytic cell with electrical leads leading to the exterior. The cell is also provided with appropriate plumbing and external structures to permit circulation of the electrolyte to a separate heat exchanger. Suitable inlet and outlet passages are also provided in the cell head space to permit the withdrawal of the gases evolved from the cathode (if gases are to be evolved) and from the anode. The two gas removal systems are typically maintained separate in order to isolate the cathode gases from the anode gases. Nitrogen and/or air may be pumped through the gas handling system in order to entrain the evolved cathode and anode gases and carry them from the cell to the exterior where they may be utilized in the desired application. Alternately, if a flow-through air or oxygen cathode is employed, its excess gases may be used for this purpose.

In order to maintain or cool the cell electrodes, heat exchange passages may be provided within the electrode structures. These coolant passages are connected to external sources of coolant liquid which can be circulated through the electrodes during the electrolysis process in order to maintain or reduce their temperatures.

In order to drive the electrolysis reaction, it is necessary to apply electric power to the cell electrodes. The electrodes are connected through the electrical leads to an external source of electric power with the polarity being selected to induce the electrolyte anion flow to the anode and the cation flow to the cathode. The power requirements are not appreciably different for those cells utilizing platinum anodes from those cells utilizing lead dioxide anodes. Electrical potentials on the order of from 2–3 volts D.C. are quite sufficient for the various cell configurations. The current requirements are most easily measured in terms of current density and may vary from a low of perhaps a tenth of an ampere per square centimeter (0.1 A/cm$^2$) up to current densities slightly beyond one ampere per square centimeter ($\leq 1.0$ A/cm$^2$). The power requirements are not necessarily dependent upon the electrolyte concentrations, nor in particular upon the anode materials. Thus, current densities of from about 0.1 A/cm$^2$ to about 1.5 A/cm$^2$ will produce maximum ozone current efficiencies at any electrolyte concentration with either beta lead dioxide anodes or platinum anodes.

U.S. Pat. No. 4,316,782 (Foller) teaches that ozone yields as high as 52% could be obtained where the electrolyte is water and either the acid or salt form of highly electronegative anions, such as hexafluoro-anions are used. Here, the term "fluoro-anions" is used to describe that family of anionic (negatively charged) species in which multiple fluorine ligands complex a central atom. Electrolysis was carried out in a range between room temperature and the freezing point of water. The preferred anode materials for use in the electrolytic cells are either platinum or lead dioxide, especially lead dioxide in the beta crystalline form. Platinum, carbon, or nickel and its alloys may be used as hydrogen-evolving cathodes. Alternatively, an air or oxygen depolarized cathode may be employed which would greatly reduce the cell voltage and enhance the overall energy efficiency of the process.

Such electrolytic solutions can be highly corrosive to the cell materials if they are not selected properly, and especially hard on the electrodes where electrochemical discharge takes place. In addition, the liberated O$_3$, being a powerful oxidizing agent, also strongly acts upon electrode materials which are susceptible to oxidizing action. The electrical properties of the electrode material are also important to the successful and effective operation of the ozone generating electrolytic cell. The electrodes must exhibit sufficient electrical conductivity to enable the utilization of current densities required by the ozone generating process without an unacceptable anode potential and must also be adaptable to whatever cooling procedures are required to maintain cell temperatures during operation.

Foller also disclosed that using an air or oxygen depolarized cathode provided several advantages. (1) The cell voltage would be substantially reduced since replacing hydrogen evolution with the reduction of oxygen theoretically saves 1.23 volts. (In actual practice a 0.8 volt swing is likely to be achieved.) (2) A separator between anode and cathode is no longer required, as no hydrogen is evolved to depolarize the anode. Further, savings in cell voltage are obtained by reducing IR losses. (3) The overall cell process becomes oxygen in and ozone out and the need for periodic additions of water is reduced. (4) The same air or oxygen fed to the air cathode could also serve to dilute and carry off the ozone that is anodically evolved by flowing through the cathode.

Air cathode technology has found recent favor in its application to fuel cells, metal-air batteries, and the chlor-alkali industry. The electrodes are generally composed of Teflon-bonded carbon containing small amounts of catalytic materials.

U.S. Pat. No. 4,375,395 (Foller) teaches that anodes made of glassy carbon are suitable for use in the preparation of ozone in an electrolytic cell utilizing an aqueous solution of the highly electronegative fluoro-anions.

U.S. Pat. No. 4,541,989 (Foller) teaches that a liquid electrolyte containing acids of fluoro-anions, such as HBF$_4$ and HPF$_6$, used in combination with a cool electrolyte solution can increase the efficiency and the ozone to oxygen yield. However, the use of a liquid electrolyte causes some problems. First, the electrodes in such electrolytic cell must be separated by a given distance to provide definition. This translates into power loss in the production of heat. Secondly, the presence of liquid electrolytes requires a sophisticated system of seals to prevent leaking of the electrolyte.

U.S. Pat. No. 4,836,929 (Laumann et al.) teaches the use of a solid electrolyte such as that made by duPont and sold under the brand "NAFION". This solid electrolyte was placed between a lead dioxide anode and a platinum black cathode. The current efficiency was increased by oxygenating a water stream fed to the anode and the cathode. In this manner, oxygen could be reduced to water at room temperature releasing an increased yield of ozone.

In his paper entitled "Synthesis of Hydrogen Peroxide in a Proton Exchange Membrane Electrochemical Reactor" (April 1993), Fenton disclosed that paired synthesis of ozone (O$_3$) and hydrogen peroxide (H$_2$O$_2$) could be carried out in the same reactor. The electrochemical reactor used a membrane and electrode assembly (M&E) comprised of a "NAFION" 117 membrane between the platinum black/ polytetrafluoroethylene (PTFE) anode and graphite/PTFE cathode. This M&E assembly was sandwiched between a carbon fiber paper (Toray Industries) on the cathode side and a platinum mesh (52 mesh, Fisher Scientific) on the anode side which were used as current collectors. This arrangement was alleged to produce some hydrogen peroxide.

Increasing the percentage of PTFE in the electrode increases the hydrophobicity of the electrode assembly and thus allows more of the gaseous reactant to reach the electrode surface by repelling the products formed. The graphite M&E with 20% PTFE produced slightly higher hydrogen peroxide than a similar M&E with 10% PTFE. This could be due to the mass transport limitation of oxygen to the membrane and electrode assembly within the less hydrophobic 10% M&E. It is preferred that the PEM reactor operate at potentials greater than 3.0 volts where the anodic evolution of ozone is favored.

Membranes containing perfluorinated sulphonic acids are typically prepared before use in an electrochemical cell by first soaking the membrane in hot water for about 30 minutes and then soaking it in 10% HCl to ensure that the entire membrane is in the $H^+$ form. The membrane has to be kept moist at all times as it acts as a conductor only when it is wet. It is preferred that the proton exchange membrane be pretreated with an aqueous solution of sulphuric acid followed by rinsing the proton exchange membrane with pure water, rinsing the proton exchange membrane with an aqueous solution of hydrogen peroxide, and rinsing the proton exchange membrane with a final rinse of pure water. The final rinse should be made at a temperature between 50° C. and 150° C. and under pressure.

In their paper entitled "Paired Synthesis of Ozone and Hydrogen Peroxide in an Electrochemical Reactor," Pallav Tatapudi and James Fenton explain that the benefits of paired synthesis in electrolyte free water include: (1) lower energy consumption costs, as two oxidizing agents can be obtained for the price of one; (2) the elimination of the need for transportation and storage of oxidants by generating them electrochemically within water on demand at an amount proportional to the waste concentration; and (3) higher aqueous phase ozone concentrations.

U.S. Pat. No. 4,416,747 (Menth et al.) discloses an individual electrolysis cell bounded by bipolar plates and having a solid electrolyte made of perfluorinated sulphonic acids ("NAFION" by duPont) with a surface coating centrally located between current-collectors and adjoining open metallic structures. A plurality of individual cells may be integrated together between end plates so that the cells are electrically connected in series, hydrodynamically connected in parallel, and combined to form a block.

The current collectors disclosed in Menth may be close-meshed expanded metal covered by an open structure having a low resistance to the flow of a liquid in the direction parallel to the planar structure. The current collectors are preferably made from titanium. The ends of the cell are formed, in each case, by a bipolar plate, which alternately acts as a cathode and as an anode. The bipolar plate is preferably made from stainless (Cr/Ni) steel. The space or chamber between the bipolar plates and the solid electrolyte is completely filled with water in which air or oxygen is suspended and/or dissolved.

The Menth assembly of the electrolysis cells basically corresponds to the filter-press type, with the liquid passing parallel to the principal planes of the cells instead of perpendicularly. The individual cells are held together between two end plates having electrical terminals thereon.

The method and apparatus disclosed in Menth, however, can support only limited current density associated with reduction-oxidation since oxygen has only limited solubility in water. Further, since the cathode chamber is filled with liquid water, the cathode electrode structure will become flooded with water. Higher current densities are desirable to cause an increase in the ozone production efficiency.

U.S. Pat. No. 4,836,849 (Laumann et al.) teaches a process for breaking down organic substances and/or microbes in pretreated feed water for high-purity recirculation systems using ozone which is generated in the anode chamber of an electrochemical cell and treated with ultraviolet rays and/or with hydrogen generated in the cathode chamber of the same cell or supplied from outside.

In light of the foregoing discussion, there exists a need for an economical method of producing ozone which will minimize voltage allowed for higher current density and produce a high concentration of ozone.

SUMMARY OF THE INVENTION

The present invention is a method for electrochemical synthesis of ozone. A source of a cathodic depolarizer is supplied to a cathode disposed in a cathodic chamber and water is supplied to an anode disposed in an anodic chamber. Electricity is then passed through an ionically conducting electrolyte that is disposed in the anodic and cathodic chambers such that the electrolyte is in intimate contact with both the anode and the cathode. The cathodic depolarizer is reduced at the cathode and the water is oxidized to ozone at the anode. The ozone gas produced at the anode is then withdrawn from the anodic chamber.

An apparatus for the electrolytic generation of ozone may comprise an anode, gas diffusion cathode and proton exchange membrane. The anode comprises a substrate and a catalyst coating wherein the substrate is selected from the group consisting of porous titanium, titanium suboxides (such as that produced by Atraverda Limited under the trademark "EBONEX"), platinum, tungsten, tantalum, hafnium and niobium, and wherein the catalyst coating is selected from the group consisting of lead dioxide, platinum-tungsten alloys or mixtures, glassy carbon and platinum.

The gas diffusion cathode comprises a polytetrafluoroethylene-bonded, semi-hydrophobic catalyst layer supported on a hydrophobic gas diffusion layer. The catalyst layer is comprised of a proton exchange polymer, polytetrafluoroethylene polymer and a metal selected from the group consisting of platinum, palladium, gold, iridium, nickel and mixtures thereof. The gas diffusion layer has a carbon cloth or carbon paper fiber impregnated with a sintered mass derived from fine carbon powder and a polytetrafluoroethylene emulsion.

The ionically conducting electrolyte is typically a proton exchange membrane having a first side bonded to the catalyst layer of the gas diffusion cathode and a second side in contact with the anode. The preferred material for the proton exchange membrane is a perfluoronated sulfonic acid polymer.

An apparatus for the electrolytic generation of ozone may comprise a plurality of individual electrolytic cells where each cell has an anode, gas diffusion cathode and proton exchange membrane, as described above. This multiple cell arrangement further includes first and second electrically insulating, chemically resistant gaskets disposed around the edges of the anode and cathode, respectively, having sections removed for internal manifolding to allow fluid flow to and from the electrode/electrolyte interfaces. First and second expanded metal communicates electrically between the electrode and an adjacent bipolar plate and facilitates fluid flow over the entire electrode surface. Each of these individual electrolytic cells are positioned in a filter-press type arrangement and connected in a series electrical circuit. The bipolar plate disposed between each of the individual electrolytic cells has a first side in electrical contact with the anode of a first adjacent cell and a second side in electrical contact with the cathode of a second adjacent cell. The apparatus also includes a set of two end plates having electrical connection means, an oxygen gas or air inlet port, a water inlet port, a cathode product outlet port and an anode product outlet port. Clamping means are used to secure the end plates and electrolytic cells tightly together.

Ozone may be electrochemically produced by supplying a source of oxygen gas to a gas diffusion cathode, wherein the gas diffusion cathode includes a gas diffusion layer and a catalyst layer. The gas diffusion layer comprises carbon cloth or carbon paper fiber impregnated with a sintered mass derived from fine carbon powder and a polytetrafluoroethylene emulsion. The catalyst layer comprises a proton exchange polymer, polytetrafluoroethylene polymer and a metal selected from the group consisting of platinum, palladium, gold, iridium, nickel and mixtures thereof. Water is supplied to an anode comprising a substrate and a catalyst coating. The anodic substrate is selected from the group consisting of porous titanium, titanium suboxides, platinum, tungsten, tantalum, hafnium and niobium. The anodic catalyst coating is selected from the group consisting of lead dioxide, platinum-tungsten alloys or mixtures, glassy carbon and platinum. Electric current is then passed through the anode and the gas diffusion cathode, which are separated by a proton exchange membrane. The proton exchange membrane is comprised of a perfluoronated sulfonic acid polymer material that is bonded to the catalyst layer of the gas diffusion cathode.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
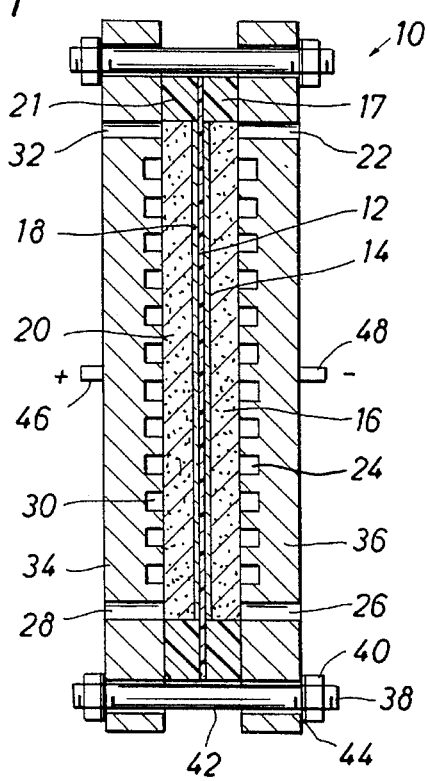
FIG. 1 is a cross-sectional side view of a depolarized ozone electrolysis cell.

Conventional water electrolysis devices utilize hydrogen formation ($2H^+ + 2e^- > H_2$) as the cathodic reaction. However, in an ozone forming electrolysis device, there are considerable benefits to eliminating the hydrogen formation reaction and replacing it with oxygen reduction reactions at the cathode. The benefits of eliminating hydrogen formation in electrolysis systems for ozone generation include: (1) lower operating cell voltage; (2) elimination of hydrogen gas explosions; (3) elimination of reactions between hydrogen and ozone in the product; and (4) the ability to provide paired electrosynthesis of ozone at the anode and hydrogen peroxide at the cathode.

The electrochemical reactions of the present invention occur by applying DC electricity between the anode and cathode. Water is fed to the anode side where two competing water oxidation reactions take place; the thermodynamically favored oxygen ($O_2$) evolution reaction Equation (1) and the ozone ($O_3$) formation reaction Equation (2).

$$2H_2O > O_2 + 4H^+ + 4e^- \qquad \text{Equation (1)}$$

$$3H_2O > O_3 + 6H^+ + 6e^- \qquad \text{Equation (2)}$$

Utilization of high overpotentials, such as anode potentials much greater than 1.3 volts, and certain electrode materials enhance ozone formation at the expense of oxygen evolution. The water oxidation reactions yield protons and electrons which are recombined at the cathode. Electrons are conducted to the cathode via the external electronic circuit. The protons are carried through a solid electrolyte, such as a proton exchange membrane (PEM), which is available from duPont under the trademark "NAFION".

The cathodic reactions involving the reduction of oxygen are given below:

$$O_2 + 4H^+ + 4e^- > 2H_2O \qquad \text{Equation (3)}$$

$$O_2 + 2H^+ + 2e^- > H_2O_2 \qquad \text{Equation (4)}$$

Specialized gas diffusion electrodes are required for these reactions to occur efficiently. The presence of oxygen at the cathode suppresses the hydrogen ($H_2$) formation reaction. Furthermore, the oxygen reactions are thermodynamically favored over hydrogen formation. In this manner, the reduction of oxygen to either $H_2O$ or $H_2O_2$ reduces the overall cell voltage (i.e., the energy required to drive this system) below that required to evolve hydrogen ($H_2$) at the cathode in an aqueous solution.

The proton exchange membrane placed between the anode and cathode is made of a polymer material having sulfonate functional groups contained on a fluorinated carbon backbone. Two such materials include a "NAFION" PEM having an equivalent weight of 1100 grams and a Dow experimental PEM (XUS-13204.20) having an equivalent weight of 800 grams. While "NAFION" 105, 115 and 117 will each operate satisfactorily in the present invention, "NAFION" 117 is the preferred "NAFION" product. However, it is anticipated that a sulfonated polymer having a nonfluorinated carbon backbone would be operable according to the present invention. Such a polymer might include polystyrene sulfonate. Additionally, such a material might be coated with a fluorinated material to increase its resistance to chemical attack. It is also anticipated that a proton exchange membrane made of a polymer material having carboxylate functional groups attached to a fluorinated carbon backbone would be operable according to the present invention. Examples include those available from Tokuyama Soda Company under the trademark "NEOSEPT-F", Asahi Glass Company under the trademark "FLEMION", Asahi Chemical Industry Company under the trademark "ACIPLEX-S" and Tosoh Corporation under the trademark "TOSFLEX IE-SA48." Further, polymeric systems based on: perfluoro bis-sulfonimides ($CF_3$-$[CF_2SO_2NHSO_2CF_2]_n$-$CF_3$); perfluoro phosphonic acids, and the corresponding carbonation acids would function satisfactorily as proton exchange membranes according to the present invention. The Dow experimental PEM gives much superior performance than the "NAFION" PEM materials, which are manufactured by duPont. However, "NAFION" has been determined to be better for impregnating platinum electrodes.

The use of a PEM instead of a liquid electrolyte offers several advantages:

fluid management is simplified and the potential of leakage of corrosive liquids is eliminated;

the membrane serves as a separator between the anode and cathode; and, the PEM/anode interface provides a chemical environment which is suited to the electrochemical ozone formation reaction.

The preferred PEMs contain perfluorinated sulphonic acids that display a very high resistance to chemical attack, such as "NAFION" 117 and "NAFION" 115. Dow Chemical's experimental PEM XUS-13204.20 is the most preferred.

The PEM-impregnated gas diffusion electrodes can be hot-pressed onto both sides of a purified proton exchange membrane, using a Carver hot press, to produce a membrane and electrode (M&E) assembly. The hot-pressing procedure involves placing a sandwich structure, consisting of the PEM and two electrodes—one at either side of the membrane—between the platens of the press at approximately 100 psi, where the platens having been previously heated to 100° C. After the temperature of the platens has been raised to within a preselected range of between 125° C. and 230° C., a preselected pressure in the range 1,000 psi to 50,000 psi is applied to the membrane and electrode assembly for a period of time varying from 15 seconds to 150 seconds. The hot pressed M&E's should be immediately removed from the hot press and mounted in an electrochemical cell.

Preferred conditions for the preparation of M&E assemblies were found to consist of a hot press temperature of 215° C., a hot pressing time of 45 seconds and a hot press pressure in the range 3,000 psi to 14,000 psi.

Lead dioxide anodes for use in the electrolytic cells of the invention may be prepared by anodic deposition. The choice of anodic substrates on which lead dioxide is deposited are limited since most metals dissolve when deposition is attempted. However, the valve metals, such as titanium, titanium suboxides (such as that produced by Atraverda Limited under the trademark "EBONEX"), platinum, tungsten, tantalum, niobium and hafnium are suitable as substrates for the anodes. When titanium, tungsten, niobium, hafnium or tantalum are utilized as substrate materials, they are first platinized to eliminate passivation problems sometimes encountered with the uncoated substrates.

Carbon in the form of graphite may be used as a substrate; however, lead dioxide adherence is a particular problem if the carbon has not been thoroughly degassed. The carbon is degassed by boiling in water for some time followed by vacuum drying over a period of days. When degassed, adherence is greatly improved with respect to thermal stress. Vitreous or glassy carbon does not appear to have the adherence problem.

Platinum is the most convenient substrate material to work with, gives the most uniform deposits, and does not present any additional problems. Platinum is therefore typically the most suitable substrate material for lead dioxide anodes. However, its high cost may make other previously mentioned substrate materials more practical for commercial use.

In any event, lead dioxide is plated onto substrates in a well known plating bath comprising essentially lead nitrate, sodium perchlorate, copper nitrate, and a small amount of sodium fluoride and water. The substrate material is set up as the anode in a plating bath with a pH maintained between 2 and 4. Current densities of between 16 and 32 milliamperes per square centimeter give bright, smooth and adherent lead dioxide deposits. Bath temperature is most usually maintained at about 60° C. at all times during deposition. The deposition is carried out with vigorous stirring of the electrolyte and rapid mechanical vibration of the anode to give consistently fine granular deposits free from pinholes or nodules. A surface active agent may be added to the plating solution to reduce the likelihood of gas bubbles sticking to the anode surface.

The limiting current for the cathodic reduction of dissolved oxygen in either water or aqueous solution may be described as follows:

$$i_l = \frac{(n \times F \times D \times Co)}{d} \quad \text{EQUATION (5)}$$

where:

$i_l$ is the limiting current;

n is the number of electrons consumed per oxygen molecule reduced to water;

F is the Faraday constant (96,484 Coulombs);

D is the diffusion coefficient of oxygen in water ($1.93 \times 10^{-5}$ $cm^2 s^{-1}$);

$C_O$ is the concentration of oxygen in water ($1.41 \times 10^{-6}$ moles $cm^{-3}$); and d is the diffusion layer thickness. (For a static liquid electrolyte, d is approximately 0.05 cm. For oxygen dissolved in a rapidly flowing or well-stirred solution, d is about 0.005 cm.)

Using the values given above, $i_l$ for the reduction of dissolved oxygen in water is $2.1 \times 10^{-3}$ amps/$cm^2$. Given this low value of $i_l$, operation of an ozone electrolysis device with the reduction of dissolved oxygen as the cathodic reaction is only possible at current densities considerably below those required for efficient ozone generation at the anode. A system which relies upon dissolved oxygen at the cathode can produce high yields of ozone, but only if hydrogen formation occurs at the cathode. The full benefits of oxygen reduction cannot be incorporated into this type of system where liquid water is allowed to flow over the surface of the cathode electrode structure.

The electrochemical reactor of the present invention provides pure air or oxygen gas to a gas diffusion cathode and feeds water only to the anode side.

The gas diffusion cathode consists of two layers: a semi-hydrophobic reaction layer (thickness of 5 μm to 100 μm) and a hydrophobic gas diffusion layer optionally having an imbedded metallic current collector or a carbon cloth or carbon fiber paper. The preferred reaction layer for the reduction of oxygen at the cathode consists of platinum black with 30% PTFE. The gas diffusion layer consists of a mixture of 4 parts carbon black and 6 parts PTFE with no platinum catalyst and having an imbedded current collector, either a metal screen, carbon cloth, or fibrous carbon paper. This layer acts as a sponge to provide high concentrations of oxygen to the catalyst layer. In this manner, the rate of reaction at the cathode surface is no longer limited by mass transport of oxygen through water. The rate of reaction is, therefore, increased and is limited only by the rate of reaction at the catalyst surface/electrolyte interface. The use of the gas diffusion layer, together with oxygen gas or air, avoids the production of hydrogen gas and supports a high current density in the electrochemical cell.

It is important to recognize that the PTFE-impregnated carbon paper fiber is hydrophobic and therefore prevents saturation of the gas diffusion layer with water. Additionally, solubilized PEM may be brushed onto the front surface of a catalyst layer. By applying the PEM in intimate contact with the three dimensional catalyst surface, the oxygen reduction reaction can take place in all three dimensions. This three dimensional bonding is accomplished by following the hot pressing technique described above. This technique, however, requires temperatures near 220° C. which approaches the decomposition temperature of the perfluorinated sulfonic acid material.

Typically, the PEM membrane separating the anode and cathode must be kept moist. This is necessary to hydrate the sulfonate sites on the polymer to allow for proton transfer through the membrane. Usually the membrane is kept moist by humidifying the oxygen source to the cathode. However, one alternative means of hydrating the membrane includes the use of tubes of approximately 4 to 9 mils diameter within the proton exchange membrane. These tubes are available from Perma-Pure, Inc. In this manner, water can be provided to the tubes along one edge of the membrane and spread throughout the membrane through capillary action.

An essential requirement of all ozone electrolysis processes is to operate at high current densities. This is because the efficiency of ozone generation is low at low current densities. At higher current densities, a higher proportion of the electrical current goes to the desired ozone formation reaction at the expense of competing or side reactions forming oxygen. The economics of ozone electrolysis systems dictate the need for operation at high current density. Firstly, because the energy cost per unit amount of ozone generated is at a minimum and secondly, the size of the electrodes, which determine the overall equipment cost, required to generate a given amount of ozone will be at a minimum when operating at high current densities where the efficiency of ozone formation is the greatest.

Figure 8:
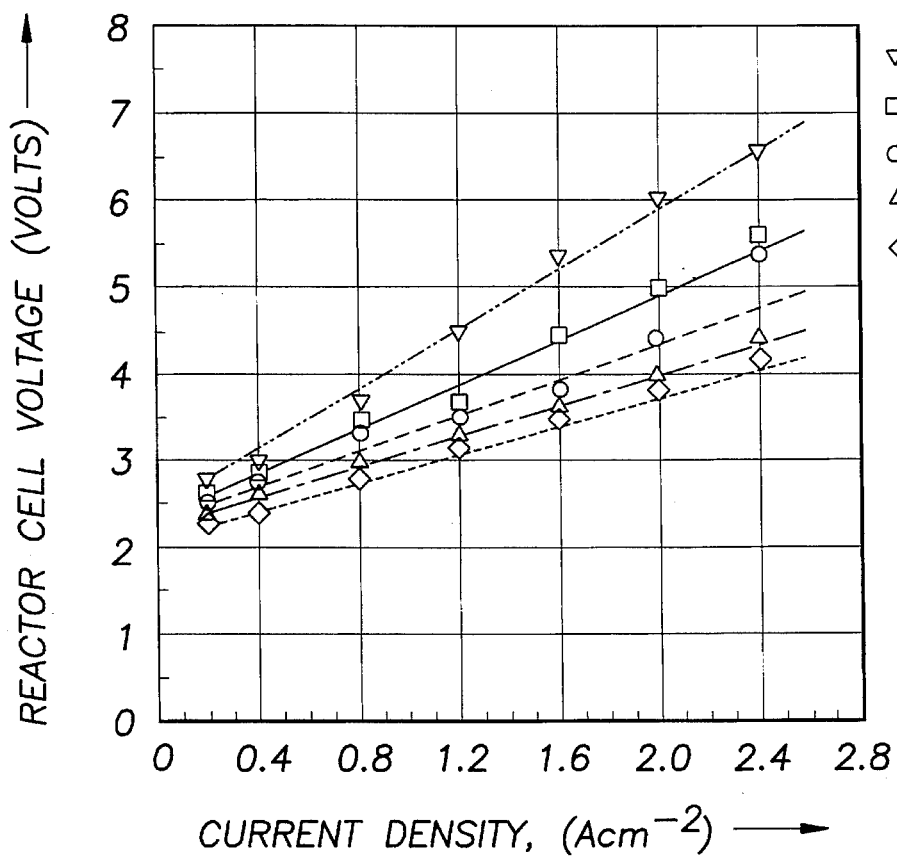
FIG. 8 is a chart showing the variation of cell voltage with current density for the air depolarized ozone electrolysis cell of FIG. 1.

The dependence of the electrochemical reactor voltage on current density for various reactor temperatures is shown in FIG. 8. Cell voltages were recorded 30 minutes after applying each current density value to allow steady state condition to be reached. The reactor temperature was measured by a thermocouple probe located in the titanium end plate. The cell voltage increased linearly with increasing current density and decreased with increasing temperature at any selected applied current density. The variation of ozone current efficiency with reactor temperature for a number of current densities is given in FIG. 9. Current efficiency is the proportion of the current supplied to the cell that goes toward the desired product ozone ($O_3$). Current efficiency was determined by first finding the ideal yield if all the current goes to ozone production. The value of the ideal yield was then compared with the actual ozone yield. The relationship given below is used to determine the ideal yield:

$$\frac{i \times t}{n \times F} = \text{yield in moles of ozone produced assuming 100\% Coulombic efficiency} \qquad \text{EQUATION (6)}$$

where:

i is the cell current in amps;

t is the time of electrolysis in seconds;

n is the number of electrons taking part in the reaction(6); and

F is the Faraday constant (96,484 Coulombs).

Figure 9:
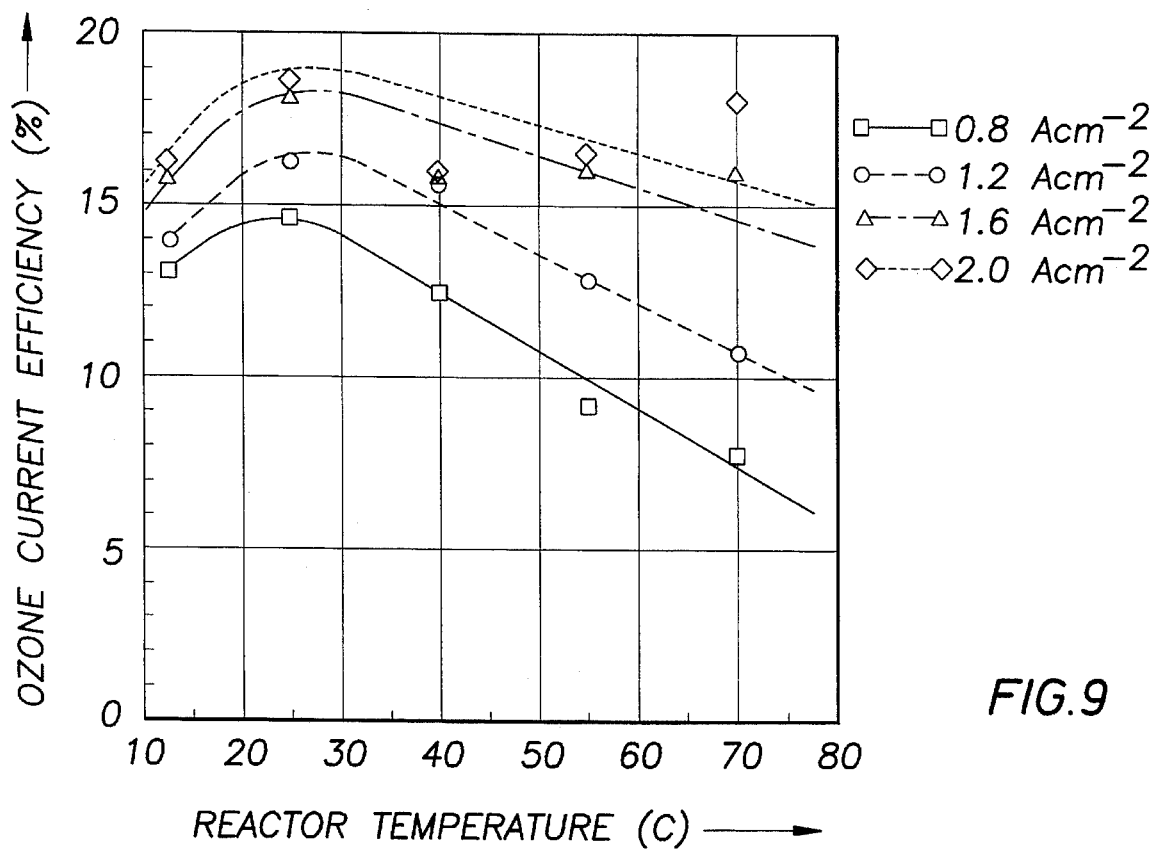
FIG. 9 is a chart showing the variation of ozone current efficiency with electrochemical reactor temperature for the air depolarized ozone electrolysis cell of FIG. 1.

The current efficiency versus temperature profiles go through a maximum at approximately room temperature for all current densities. The profiles presented in FIG. 9 show that the current efficiency maximizes at 18 to 19 percent on operating the electrochemical reactor at a current density of 1.6 to 2.0 amps per square centimeter and a temperature of 23° C.

The DC electrical energy requirement (J) for ozone production in kilowatt hours per kilogram (kWh/kg) of ozone is given by the following equation (7):

$$J = \frac{E \times n \times F}{3600 \times N \times m} \qquad \text{EQUATION (7)}$$

where:

E is the cell voltage;

n is the number of electrons released per mole of ozone formed (6);

N is the current efficiency; and

M is the molecular weight of ozone (48 grams).

As can be seen from the above figures, the reaction rate, ozone current efficiency and conductivity of the PEM electrolyte are dependent upon temperature. Temperature is typically controlled by the circulation and heat exchange of the water flowing to the anode.

One advantage of the electrochemical methods of the present invention is the ability to provide paired synthesis or paired electrosynthesis. The term "paired synthesis" means that the product generated at both the anode and cathode may be used together in a common application. For example, the present invention allows for selective generation of hydrogen peroxide, $H_2O_2$, at the cathode and generation of ozone, $O_3$, at the anode. Both of these desired products may be collected together and used in various applications, such as the treatment of waste water streams. Therefore, the process can generate twice as much oxidant product as was possible before.

According to the present invention, an electrochemical cell for the production of ozone may be constructed by placing a proton exchange membrane between an anode and a cathode. The cathode may be coated with a semi-hydrophobic catalyst material supported on a layer of carbon paper fiber impregnated with a sintered mass derived from fine carbon powder and Teflon emulsion. The anode is exposed to a source of water and the gas diffusion cathode is exposed to oxygen gas or air. An external electrical circuit is necessary to provide electron flow from the anode to the cathode, while the PEM provides for proton flow. Also, the electrochemical cell must provide a means for collecting the produced ozone.

The present invention also encompasses the use of a multiple cell arrangement, otherwise referred to as "filter press arrangement." This arrangement stacks individual cells back to back, in series, so that the current or electricity flows through one cell to the next. Each cell is separated by a bipolar plate which allows the electricity from the anode of a first cell to pass through to the cathode of a second cell. Each cell must also be provided with a source of water to the anode surface and a source of oxygen gas to the gas diffusion cathode. These requirements of the present invention may be accomplished through numerous embodiments. The preferred embodiment for carrying out the method of the present invention is disclosed as follows:

Referring to FIG. 1, a cross-sectional side view of a depolarized ozone electrolysis cell 10 is shown. A proton exchange membrane (PEM) or a solid polymer electrolyte (SPE) 12, such as a perfluorinated sulfonic acid polymer, is disposed in the center of the cell. Bonded to one side (the cathodic side) of the solid electrolyte 12 is the electronically conducting, semi-hydrophobic, oxygen reduction electrocatalyst layer 14 of the gas diffusion cathode. This electrocatalyst layer 14 may be comprised of Teflon-bonded platinum black or carbon-supported high surface area platinum. The gas diffusion layer 16 of the gas diffusion electrode is integrally formed onto the catalyst layer 14.

On the other side (the anodic side) of the solid electrolyte 12 is an anode made up of a catalyst layer 18 formed on a substrate 20. The electronically conducting, hydrophilic, ozone forming electrocatalyst layer 18 is made of lead dioxide ($PbO_2$) or a platinum-tungsten alloy (Pt/W). The substrate 20 is a porous, non-corroding, electronically conducting support material that is preferred to be fabricated using sintered titanium (or tantalum) particles.

Two non-conducting gaskets 17 and 21 are placed on either side of the solid electrolyte 12. The gaskets 17 and 21 have cutouts to fit around the perimeter of the cathodic gas diffusion electrode and the anodic substrate 20, respectively. The gasket should have a thickness greater than that of the cathodic gas diffusion electrode and the anodic substrate 20 so that it may be sufficiently compressed to seal liquids and/or gases.

The cathodic chamber of electrochemical cells of the present invention is surrounded and sealed with gasket materials well known to one skilled in the art. Gasket materials can be selected from the group consisting of neoprene, silicone rubber elastomer materials, Viton, Kalrez, and urethanes. The elastic nature of these materials compensate for any contraction/expansion encountered in electrochemical cells of the present invention under various operating conditions. Because of the highly oxidizing aggressive environment encountered in the anodic side of electrochemical cells, gaskets will be selected from the group of fluorocarbon-based polymeric materials consisting of polytetrafluoroethylene (PTFE or Teflon), chlorotrifluoroethylene, polytetrafluoroethylene containing organic or organic fillers, copolymer of tetrafluoroethylene and hexafluoropropylene (FEP), polyvinylidene fluoride (PVDF), and fluorocopolymers containing vinylidene fluoride and hexafluoropropene.

A cathodic depolarizer, typically a gas such as oxygen, enters the cell through port 22 which is in fluid communication with a series of channels 24 for fluid flow to the gas diffusion layer 16 of the cathode. The depolarizer gas and the products generated, such as liquid hydrogen peroxide, flow out of the cell 10 through port 26. The depolarizer flow is typically downward across the cathode so that the liquids generated can more easily be removed from the cell.

In a similar manner, water is fed into the cell 10 for exposure to the anode electrocatalyst layer 18 through port 28. The water flows through the channels 30 and out the port 32. The water flow is typically directed upward across the anode so that gaseous oxidation products do not become trapped in the cell.

The structure of the cell 10 is held together with two metal end plates 34 and 36. The metal end plates can be selected from the group of metals consisting of iron, nickel, copper, aluminum, stainless steels, other corrosion-resistant alloys such as those sold by Inco Alloys International, Inc., Huntington, W.Va., under the trademark "Monel" (predominantly nickel and copper, and containing small percentages of carbon, manganese, iron, sulfur, silicon, aluminum, titanium, and cobalt), and under the trademark "Inconel" (predominantly nickel and chromium, and containing varying percentages of iron, carbon, copper, manganese, silicon, titanium, columbium, aluminum, cobalt, and tantalum) or Haynes International Inc. of Kokomo, Ind. under the trademark "Hastelloy" (predominantly nickel and containing varying percentages of chromium, manganese, iron, copper, cobalt, titanium, aluminum, carbon, tungsten, and molybdenum), titanium, tantalum, hafnium, niobium and zirconium. The preferred metal is titanium. The surfaces of the end plates can be plated with a noble metal selected from the group consisting of platinum, gold, palladium, ruthenium and iridium. The end plates 34 and 36 are secured together by a plurality of cell tie rods 38 having male threads and a plurality of nuts 40. To keep the endplates 34 and 36 electrically isolated from each other, a plurality of electrically insulating sheaths 42 and washers 44 are used in conjunction with each rod 38 and nut 40, respectively. Having electrically isolated the endplates 34 and 36, a positive terminal or busbar 46 and a negative terminal or busbar 48 can be connected to a DC power source (not shown).

Figure 2:
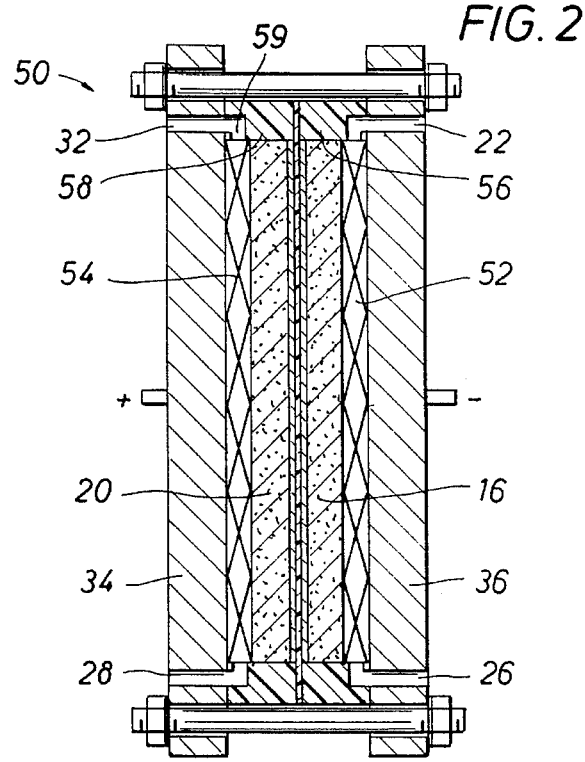
FIG. 2 is a cross-sectional side view of a second embodiment of a depolarized ozone electrolysis cell.

Referring now to FIG. 2, a second embodiment of the present invention is shown. The electrochemical cell 50 is substantially similar to the cell 10 of FIG. 1, except that the channels 24 and 30 (shown in FIG. 1) have been substituted with non-corroding, electronically conducting, expanded metal 52 and 54, respectively. The expanded metal includes either an expanded metal sheet, a metal wire mesh or a metal foam. The expanded metal 52 and 54 still allow flow from port 22 to port 26 and from port 28 to port 32, respectively, but provides a more turbulent flow pattern and leave a greater portion of the electrode surface area exposed to fluid flow. Also note that the gaskets 56 and 58 have a compressed width equivalent to the anodic substrate 20 plus the expanded metal 54 or the cathodic gas diffusion electrode plus the expanded metal 52. A slot 59 has been cut in the gasket to allow flow from between the ports.

Figure 3:
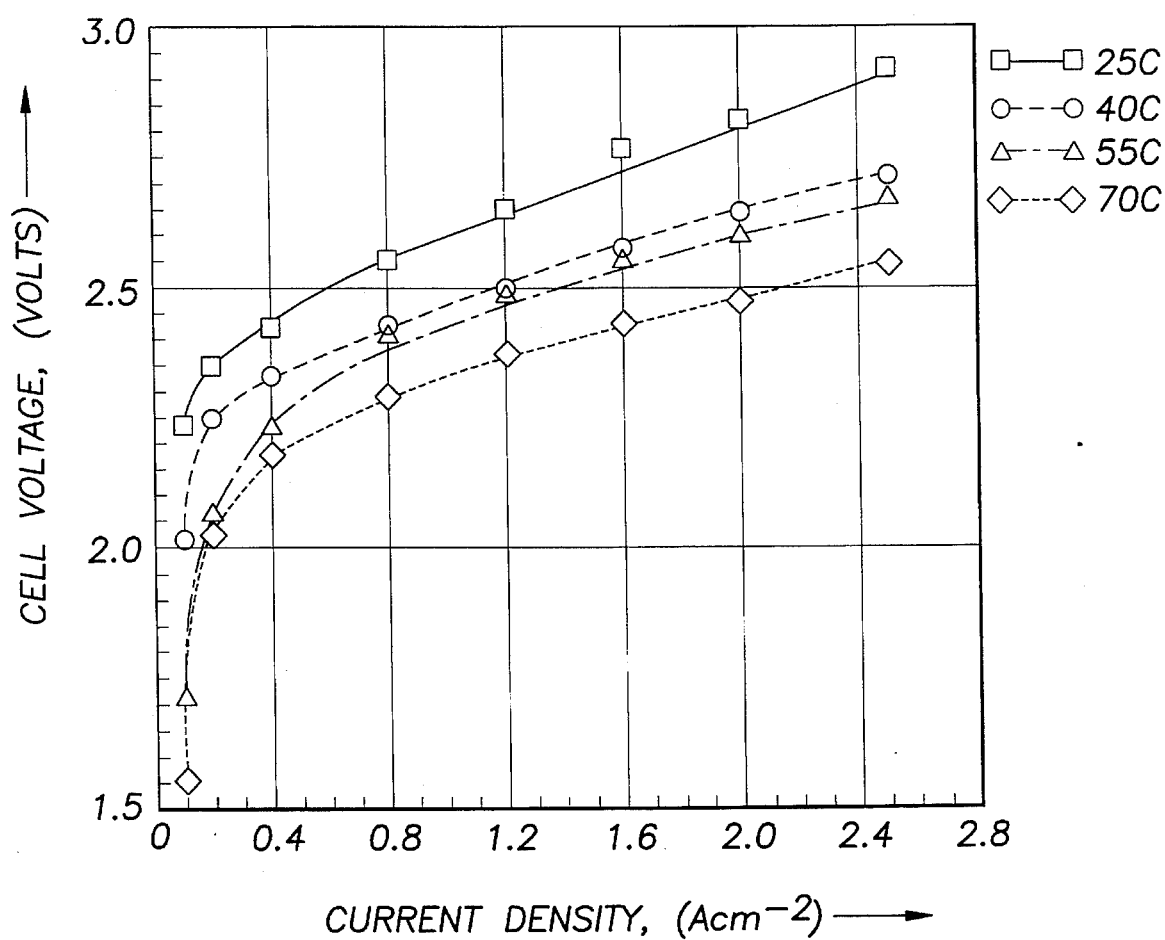
FIG. 3 is a chart showing the variation of cell voltage with current density for the oxygen depolarized ozone electrolysis cell of FIG. 2.

Now referring to FIG. 3, the variation of electrochemical cell voltage with current density applied to the anodic and cathodic electrodes of the cell represented schematically in FIG. 2 illustrated. It can be seen from FIG. 3 that the cell voltage, hence, the electrical energy consumed, decreases with increasing cell temperature for any given applied current density. In obtaining the data represented by FIG. 3, pure oxygen gas, as a cathodic depolarizer, was fed into the cathode chamber of the cell represented schematically in FIG. 2 under a pressure of 40 psi. At the same time, water was recirculated over the anode surface under atmospheric pressure. The low cell voltages obtained on using oxygen gas as a cathodic depolarizer give rise to a considerable improvement over the corresponding cell voltages described in the state of the art.

Figure 4:
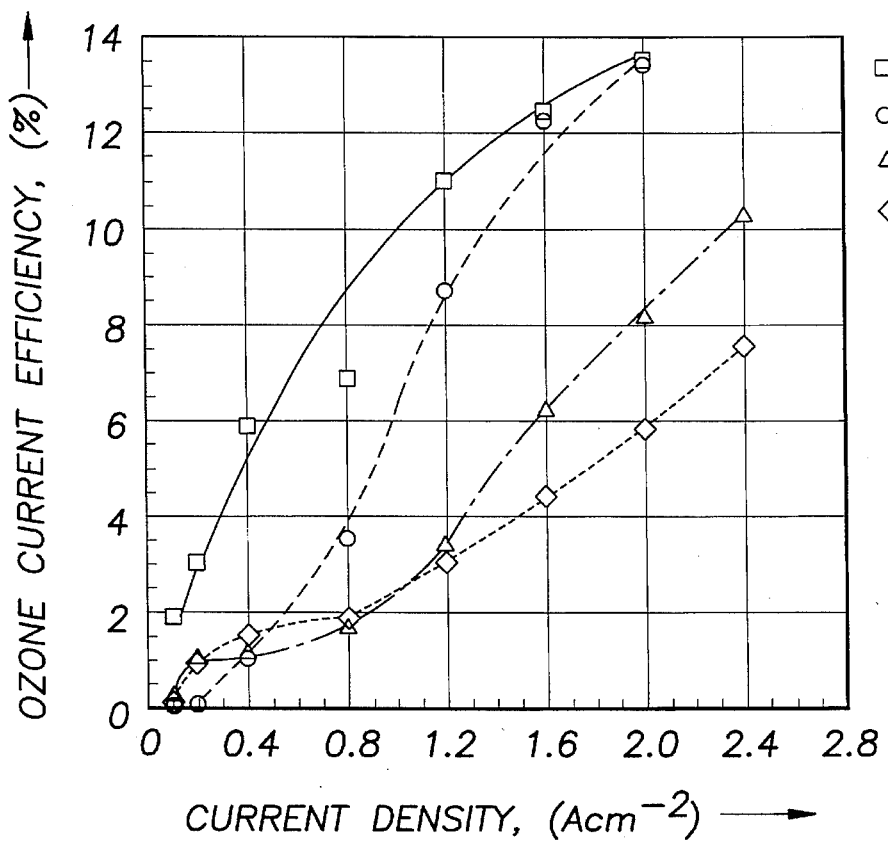
FIG. 4 is a chart showing the variation of ozone current efficiency with current density for the oxygen depolarized ozone electrolysis cell of FIG. 2.

Now referring to FIG. 4, the dependence of ozone formation current efficiency on the current density applied to the anode and cathode of the cell represented schematically in FIG. 2 is illustrated. High current efficiencies are only achieved as a result of applying high current densities which normally give rise to high cell voltages. However, with the present invention, the use of a cathodic depolarizer, for example, oxygen gas in the case, enables high current densities to be reached while maintaining low cell voltages. A high ozone current efficiency is desirable so as to make the apparatus as compact and as efficient as possible.

Figure 5:
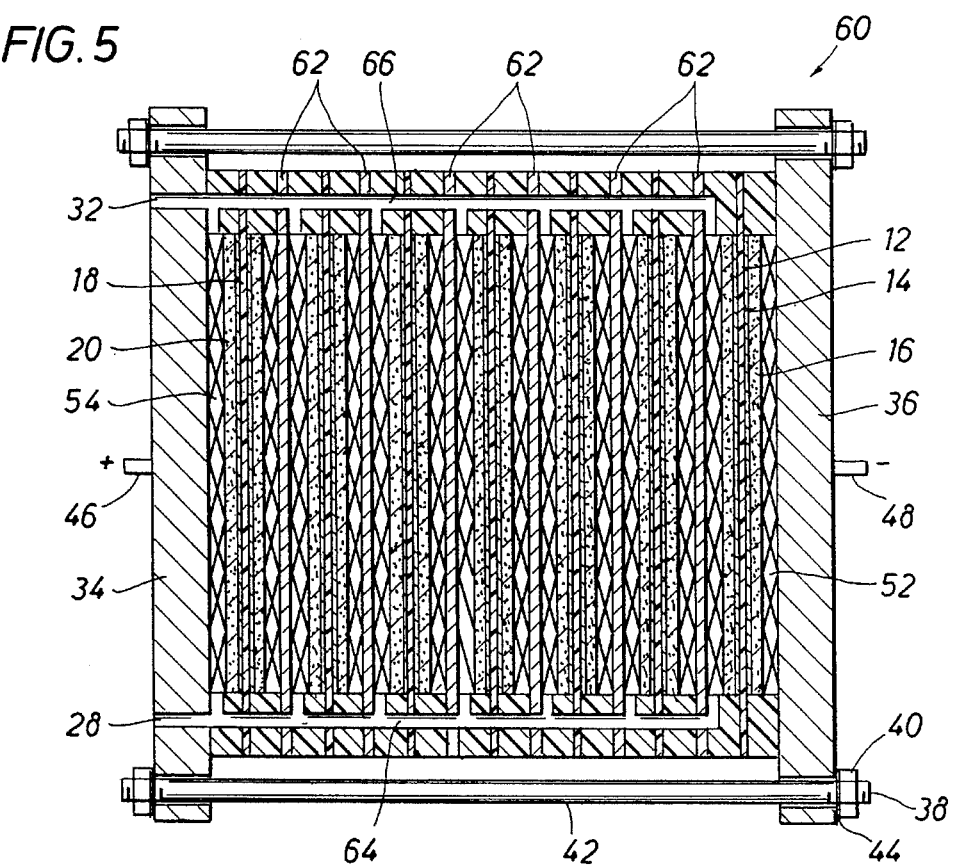
FIG. 5 is a cross-sectional view of a multiple cell arrangement of the depolarized ozone electrolysis cell of FIG. 2 where the cells are electrically connected in a series circuit.

Now referring to FIG. 5, a cross-sectional view of a multiple cell arrangement 60 of the depolarized ozone electrolysis cell of FIG. 2 is shown, where the cells are electrically connected in a series circuit. The same numbering system as used in FIG. 1 and FIG. 2 has been incorporated into FIG. 5. Accordingly, FIG. 5 shows seven electrochemical cells separated by six bipolar plates 62. The bipolar plate 62 of the present invention can be made from a metal selected from the group of valve metals consisting of titanium, tantalum, hafnium, zirconium or from the group of metals known as stainless steels which include SS304, SS316 and other high chromium/nickel-cantaining alloys. The bipolar plate can have a thickness in the range of 0.2–2 mm (8–80 mils). Both flat surfaces of the bipolar plate may be plated with a thin layer of a noble metal selected from the group containing platinum, gold palladium and iridium. The bipolar plate has sections removed for internal manifolding to allow fluid flow between adjacent cells. delivered to the anode 20 of each individual cell of the multiple cell arrangement 60 via manifold 64, carried over expanded metal 54 of each individual cell, collected via manifold 66 and removed through port 32. A similar manifold system for the cathode is positioned at 90 degrees of rotation from that for the anode.

Figure 6:
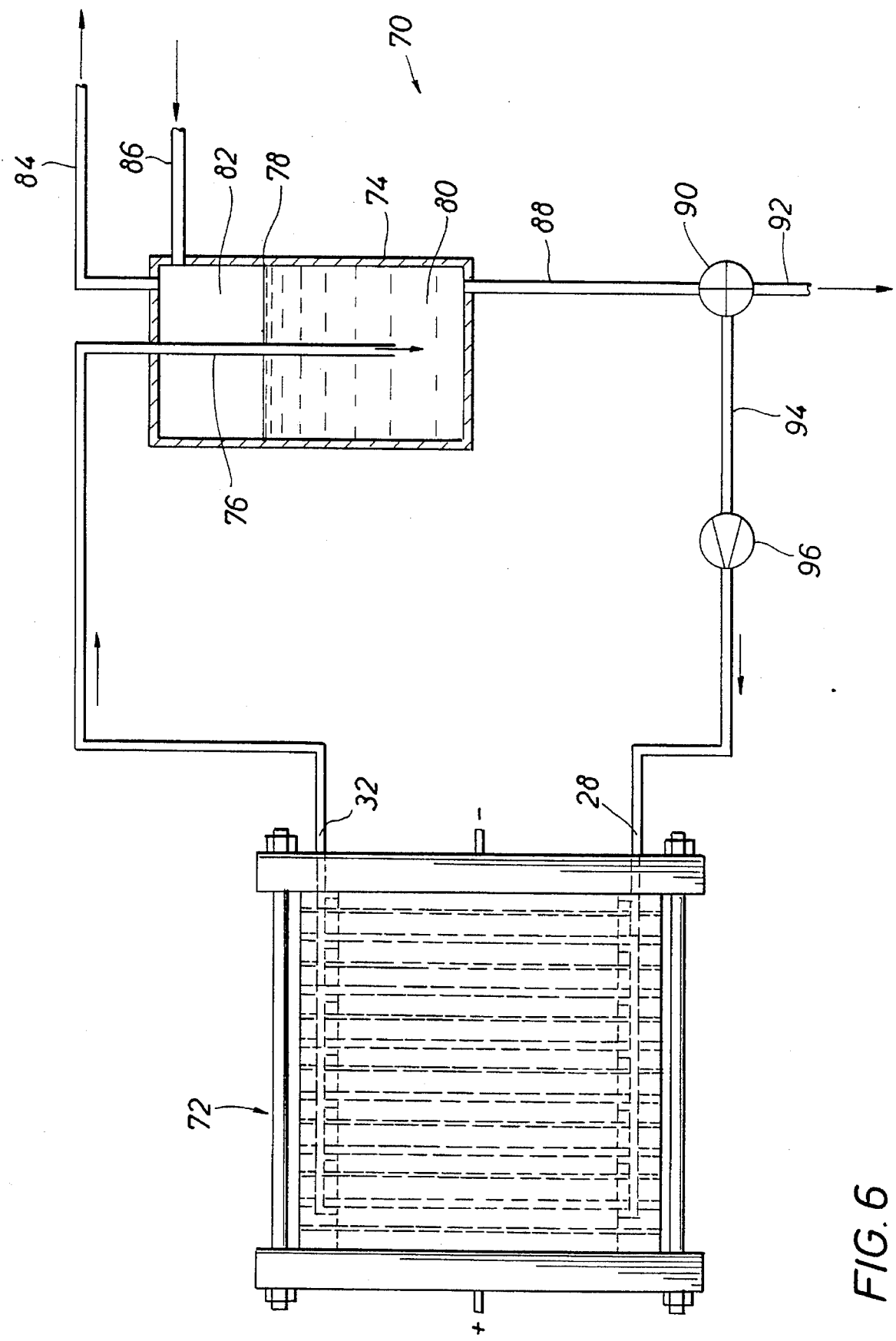
FIG. 6 is a schematic diagram of the apparatus of FIG. 5 in combination with ancillary equipment for the electrochemical production of ozone gas and/or ozonated water.

FIG. 6 shows an apparatus 70 for carrying out a process for the electrochemical production of ozone gas and/or ozonated water. An electrochemical cell 72 is used for the production of ozone from water according to the apparatus of FIG. 5. Water is input to the cell 72 through port 28 and is removed through port 32, as described previously. The water exiting port 32 contains entrained ozone gas. The ozone-laden water flows into a gas/liquid separator tank 74 via pipe 76. The ozone then disengages from the water 80 and rises into the vapor space 82. The ozone is removed from tank 74 through outlet pipe 84. Makeup deionized water may be added to the tank 74 through pipe 86.

The water 80 is withdrawn from tank 74 through pipe 88. The water in pipe 88 may be either discarded by directing flow through valve 90 to pipe 92 or recycled by directing flow to the recycle line 94. The recycle line 94 passes through a pump 96 before feeding the water into port 28.

Figure 7:
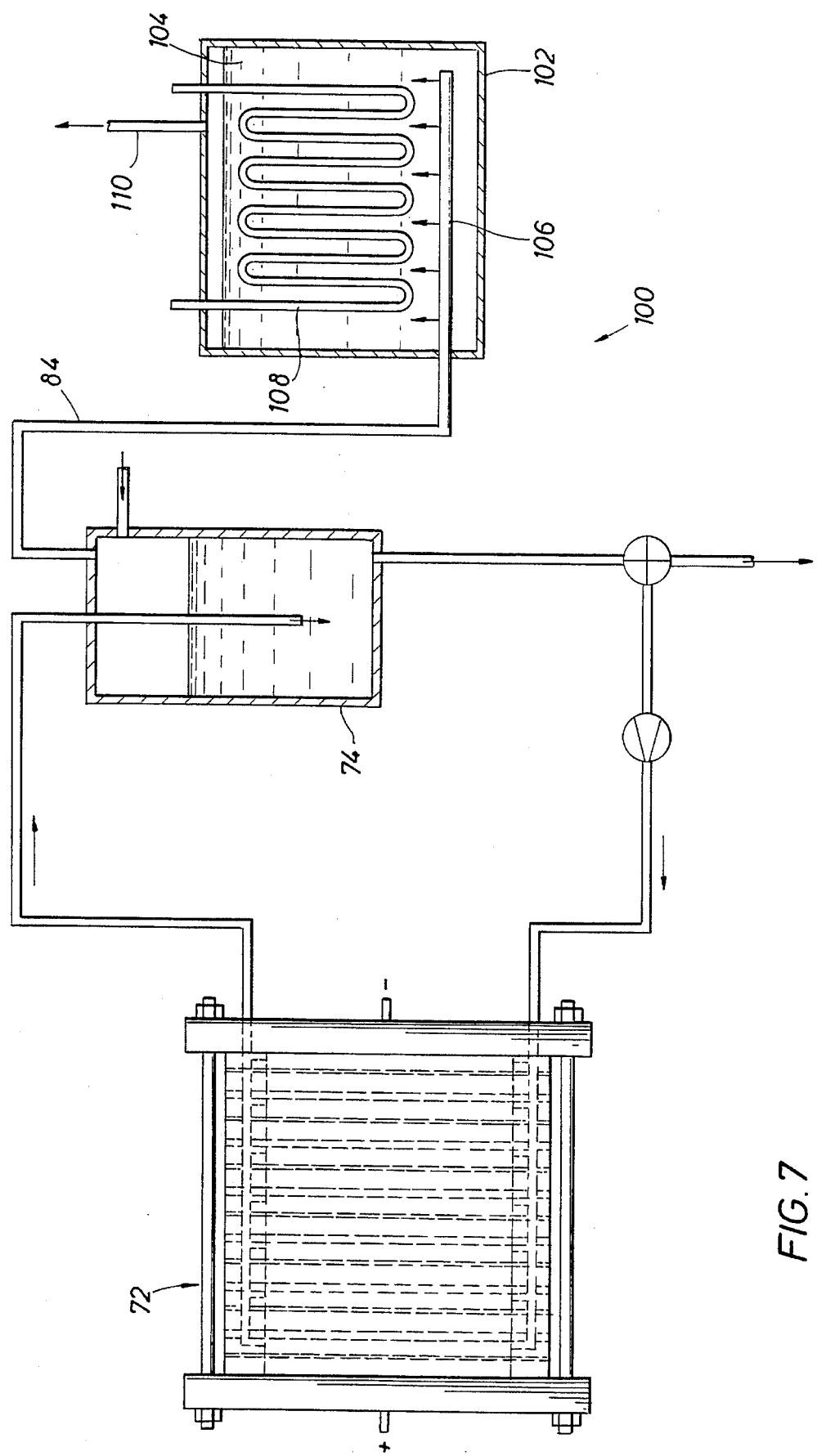
FIG. 7 is a schematic diagram of the apparatus of FIG. 6 in combination with ancillary equipment used in a process for the purification of water.

FIG. 7 is a schematic diagram of the apparatus of FIG. 6 in combination with ancillary equipment used in a process for the purification of wastewater 104. The apparatus 100 is identical to that of FIG. 6 with the addition of a vessel 102 for purifying water. Ozone produced in electrochemical cell 72 and separated in tank 74 is delivered to vessel 102 through pipe 84. The ozone is evenly distributed in the vessel 102 through a porous, non-corrosive metal tube 106, preferably made of titanium, for introducing very fine $O_3/O_2$ gas bubbles into the water 104. Ozone bubbles rise up through the water 104 and contact certain organic and biological material. The ozone, which may contain hydrogen peroxide, is combined with ultraviolet light from serpentine-shaped UV lamp 108 to produce hydroxyl radicals which react nonselectively with dissolved organics to cause their complete oxidation to carbon dioxide ($CO_2$). Oxygen and carbon dioxide are then released from the vessel 102 through exhaust pipe 110. The wastewater may be purified either as a batch process or continuously as will be apparent to one with ordinary skill in the art.

It will be apparent to one with ordinary skill in the art that the methods of the present invention may be accomplished through numerous equivalent embodiments including various geometric configurations.

The method of the present invention can include the disengagement of the product ozone gas from water. However, this can be easily accomplished in a vessel of short residence time where the ozone will quickly disengage from the water. In this manner, ozone may be collected in a concentrated gaseous product which facilitates its use in numerous applications. For example, the product ozone of the present invention may be applied to severe waste water applications. Prior art devices such as those taught by Stucki require the intimate contact of the waste water with the anode. This caused numerous problems as the contaminants of the waste water would foul the anode and reduce cell efficiency. This problem has been overcome by the present invention.

EXAMPLE #1

Referring to FIG. 2 and to FIG. 6, a trial run of the disclosed invention was practiced. Lead dioxide, electroplated onto a sintered porous titanium substrate (Astro Met, Inc.), was used as the anodic electrode material. Prior to applying the lead dioxide electrocatalyst layer, the porous titanium substrate was first cleaned by glass bead blasting, followed by sonication in water, and plated with a thin layer of platinum, using a commercial plating solution (Engelhard Corporation). A commercially available platinum-catalyzed gas-diffusion electrode (ELAT, E-TEK, Inc.) was used as the cathodic electrode material. The anodic and cathodic structures each had an active area of 25 $cm^2$. The anodic and cathodic electrocatalyst layers were impregnated with a 5 wt % Nation® solution in a mixture of lower aliphatic alcohols and 10% water (obtained from Aldrich Chemical Company) and dried, yielding PEM loadings of ~0.6 mg. $cm^{-2}$. The PEM-impregnated cathodic gas-diffusion electrode was bonded to one side of a precleaned Dow experimental proton exchange membrane (XUS-13204.20) by means of hot-pressing under optimum conditions. The PEM-impregnated lead dioxide-plated porous titanium substrate (as the anodic electrode) was placed on the other side of the Dow proton exchange membrane.

The membrane and electrode assembly obtained, along with two pieces of platinum-plated expanded titanium metal (where one each of the expanded metals was in contact with the other planar surfaces of the anodic and cathodic electrodes), together with two Teflon gaskets, were inserted between two platinum-plated titanium endplates of a single electrochemical cell, representative of that shown schematically in FIG. 2. The chemically stable Teflon gaskets were used to seal the cell components on bolting the endplates, together with electrically insulated bolts and nuts, using a torque of 50 inch-pounds. Electrical connections between the positive and negative endplates and a Hewlett-Packard model 6572A DC power supply were made, using insulated wire leads. Two additional screws, placed on the sidewall of each endplate, allowed the measurement of cell voltages, using a Fluke (model 8050A) digital multimeter.

Performance characterizations of the single electrochemical cell were carried out using the test apparatus shown in FIG. 6. Teflon swagelok fittings and Teflon tubing were used in connecting the electrochemical cell to the source of pressurized oxygen gas, Teflon-lined pump (Cole-Parmer micropump model 020-000), water/gas separator (water reservoir) and gas-phase ozone analyzer. The water/gas separator (water reservoir) was made of Pyrex glass. Pure oxygen gas as a cathodic depolarizer was supplied in the manner of a single pass to the cathodic inlet port from a pressurized cylinder at a pressure of 40 psi. To maintain a pressure of 40 psi within the cathode space in the electrochemical cell, a back-pressure regulator set at 40 psi was connected to the cathodic outlet port. While maintaining a constant pressure of 40 psi, an oxygen gas flow rate through the cathode space of the electrochemical cell of 500 ml min$^{-1}$ was achieved. Water was recirculated continuously over the surface of the anode at a flow rate of 200 ml min$^{-1}$ from the water reservoir which contained 300 ml of water. The return water recirculation loop passed through a heat exchanger (Astro Metallurgical, Inc.; ACX heat exchanger, model 4X8-14) before entering the anodic inlet port.

An ozone monitor (Ozone Research and Equipment Corporation, model 03M-110) was used for measuring gas-phase ozone concentrations. The ozone-containing gas stream was separated from the fluid flow exiting from the anodic outlet port in the water/gas separator at atmospheric pressure. The gas stream was then fed into the inlet of the ozone monitor under atmospheric pressure. This instrument measures the absorption of UV light by ozone at 254 nm and provides a direct determination of ozone concentrations in terms of mg/standard liter or mg min$^{-1}$. Knowing the amount of electrical charge passed during the electrochemical formation of ozone allowed a determination of its current efficiency to be made.

The experimental parameters varied systematically were the applied current density and electrochemical cell temperature. The corresponding parameters measured were the cell voltage and the concentration of ozone in the gas phase. The dependence of electrochemical cell voltage on current density for various cell temperatures is shown in FIG. 3. Cell voltages were recorded 60 minutes after applying each current density value, so as to allow steady state conditions to be reached. Constant electrochemical cell temperatures were maintained by circulating water from a large constant temperature water bath (Lauda model K-4IRD) through the heat exchanger. The cell temperature close to the PEM/ electrode interfaces was measured by means of a thermocouple probe placed in a thermowell that was drilled into the sidewall of one of the titanium endplates at a location close to the electrode surface. It can be seen from FIG. 3 that the cell voltage increases rapidly at low current densities followed by a more gradual increase at higher current densities. However, the cell voltage decreases with increasing temperature at any given applied current density. The cell voltage is a combination of the reversible cell voltage, overpotential losses at each electrode and ohmic drops internally within the M&E assembly and in the external electrical connections.

The variation of ozone current efficiency with applied current density for a number of electrochemical cell temperatures is presented in FIG. 4. For all current densities, the ozone current efficiencies were highest for the lowest cell temperature and decreased for any given current density with increasing temperature. At the lowest temperature, the ozone current efficiency-current density profile approached a maximum current efficiency of the order of 15% at a current density of approximately 2.5 A cm$^{-2}$.

It is apparent from the profiles given in FIG. 3 that the energy required to impress a given current density between the anode/proton exchange membrane/cathode sandwich decreases with increasing electrochemical cell temperature. The profiles given in FIG. 4 show that, at high current densities, the ozone current efficiency is only slightly affected with increasing electrochemical cell temperature.

At a current density of 1.6 A cm$^{-2}$, the rate of ozone production by the electrochemical cell was 25 mg of $O_3$ per minute. Taking the electrochemically active dimensions of the cell (5 cm×5 cm×0.6 cm), yields a volume of 15 cm$^3$. This illustrates the compact nature of the electrochemical cell of the present invention. Since single cells of the present invention can be stacked in series to form a unitary structure, as represented schematically in FIG. 5, further stacking will result in a high ozone output within extraordinarily compact dimensions.

EXAMPLE #2

Referring now to FIG. 1 and FIG. 6, another example of the performance derived from the disclosed invention is outlined. The anodic electrode was prepared in a manner identical to that described in Example #1 above. However, a PEM-impregnated high surface area palladium black-catalyzed, gas-diffusion electrode was used as the cathodic electrode material. The palladium electrocatalyst layer was prepared by adding 3 ml of water to 1.68 g of high surface area palladium black powder (Johnson Matthey, Inc.) and sonicated for 20 minutes. 0.22 g of Teflon emulsion (available from duPont) was added to this mixture, followed by 20 minutes of additional sonication, the mixture was then applied to one side of a commercially available gas-diffusion electrode (E-TEK, Inc.) and heated in an inert atmosphere at 350° C. for three hours.

The PEM-impregnated anodic and cathodic electrode structures, each having an active area of 5 cm$^2$, were bonded on either side of a precleaned segment of Nafion 117 PEM material. The membrane and electrode assembly obtained, together with two Teflon gaskets, were inserted between titanium endplates of a single electrochemical cell, represented schematically in FIG. 1. The inner surfaces of the titanium endplates were electroplated with a thin platinum film to prevent poorly electronically conducting oxide film growth on the surfaces of the endplates. Humidified air was supplied to the inlet port of the cathodic endplate from a pressurized air cylinder. A back pressure regulator was connected to the cathodic outlet port and set to give an air pressure within the cathode space of the electrochemical cell of 80 psi, while allowing an air flow rate of 500 ml min$^{-1}$. Water was recirculated continuously over the back surface of the anode at a flow rate of 150 ml min$^{-1}$. The anodic water reservoir had a volume of 500 ml.

Performance characterizations of the single electrochemical cell were carried out using the experimental test apparatus shown in FIG. 6 and as described in Example #1 above, except that electrical connections on the outside surfaces of the titanium endplates were made to a Hewlett-Packard (model 6282A) DC power supply. Cell voltages were recorded 30 minutes after applying each current density value, so as to allow steady state conditions to be reached. The dependence of electrochemical cell voltage on current density for various cell temperatures is shown in FIG. 8. The cell voltages increased almost linearly with increasing current density and decreased with increasing temperature for any given applied current density.

Dissolved hydrogen peroxide in water electrosmotically transported through the proton exchange membrane was sampled at the exit port from the cathode endplate, shown in the schematic given in FIG. 1. Hydrogen peroxide concentrations were measured using an Orbeco Aqua Analyzer II spectrophotometer. Dissolved ozone concentrations were determined by colorimetry at 600 nm, using samples of ozonated water withdrawn from the water/gas separator, shown in the schematic given in FIG. 6. The highest dissolved ozone concentrations in water, measured at atmospheric pressure, were in the range 10–20 ppm. The values of dissolved ozone were influenced considerably by the temperature of the electrochemical cell. Ozone gas concentrations were determined, as described in Example #1 above, using gas samples withdrawn from the water/gas separator, as illustrated in FIG. 6.

The variation of ozone current efficiency with electrochemical cell temperature for a number of current densities is given in FIG. 9. The current efficiency-temperature profiles go through a maximum at approximately room temperature for all current densities. This is a considerable advantage for the PEM-based electrochemical cell of the present invention. The profiles presented in FIG. 9 show that the current efficiency maximizes at 18–19% on operating the electrochemical cell at a current density of 1.6–2.0 A cm$^{-2}$ and a temperature of 25° C.

The electrochemical cell, represented schematically in FIG. 1, yielded an ozone production rate of 5 mg of $O_3$ per minute. The cell had electrochemically active dimensions of 2.24 cm×2.24 cm×0.3 cm giving a volume of 1.5 cm$^3$. Again this example illustrates the compact nature of the electrochemical cell of the present invention for the production of ozone gas.

Figure 10:
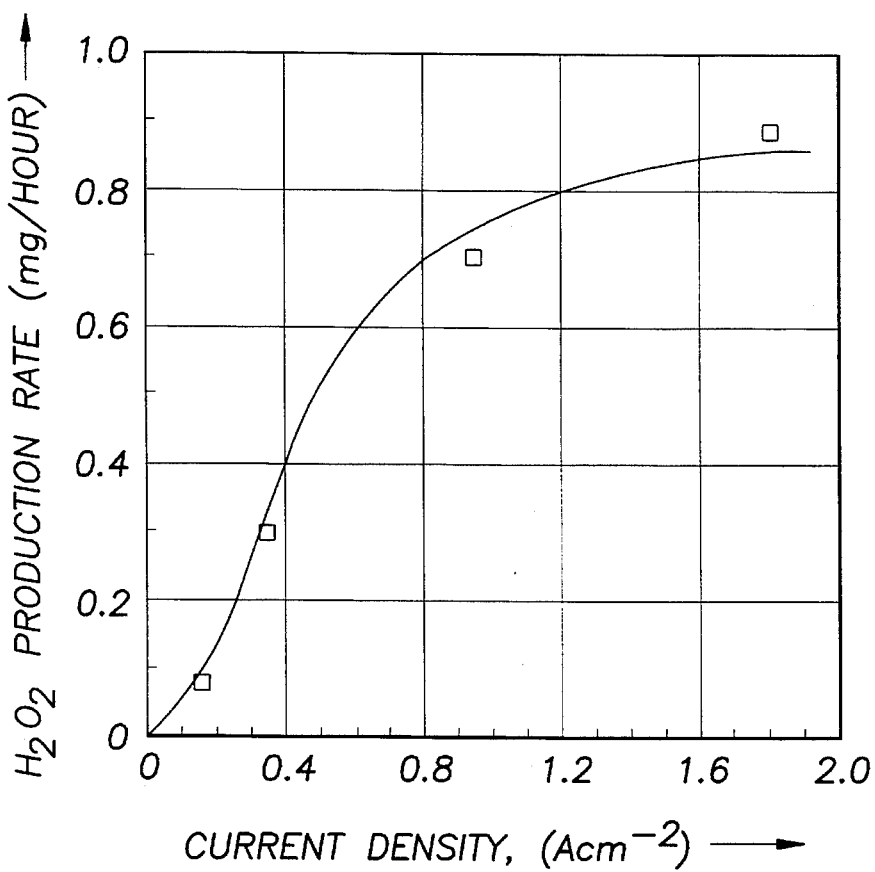
FIG. 10 is a chart showing the variation of hydrogen peroxide production rate with current density for the air depolarized ozone electrolysis cell of FIG. 1.

Variation of the hydrogen peroxide production rate with applied current density on operating the electrochemical cell represented schematically in FIG. 1 in a paired oxidant synthesis manner is given in FIG. 10. The hydrogen peroxide production rate increases with increasing current density and approaches a maximum value at an applied current density of 1.6 A cm$^{-2}$. Because of the low hydrogen peroxide production rates, calculated current efficiencies were very low and, in all cases, were less than 1%.

Another embodiment of the present invention may be referred to as an electrochemical cell for the production of ozone incorporating a cathodic depolarizer. A cathodic depolarizer totally eliminates hydrogen evolution at the cathode and may lower the cell voltage required to produce ozone.

Application of a DC source of electrical energy to two electronically conducting electrodes immersed in an aqueous electrolyte can bring about the decomposition of water molecules into their constituent elements, namely hydrogen and oxygen gases. This process is particularly favored if the anions and cations associated with the electrolyte do not undergo electrochemical reactions at the electrode/solution interfaces. Aqueous solutions of acids, salts and bases are most commonly used as electrolyte solutions. The mineral acids: sulfuric; phosphoric; tetrafluoroboric and hexafluoro-phosphoric are particularly suitable. It is also anticipated that phosphonic, sulfonic, perfluoro bis-sulfonimides and the corresponding carbonation acids in monomeric, dimeric or oligomeric forms would be operable according to the present invention. Supplying an external source of DC electrical energy to an electrochemical cell that brings about the decomposition of water is referred to as an electrolysis process and the electrochemical cell is referred to as an electrolysis cell. In order to minimize heating effects within the electrolysis cell and, hence, to lower the consumption of electrical energy, the positive and negative electrodes are placed as close as possible to each other without short circuiting taking place. In order to minimize the space between the positive and negative electrodes, a separator material is usually placed between them. Separators are thin film materials, either inorganic (asbestos) or organic such as the microporous polypropylene polymer material sold by Hoechst Celanese Corporation of Charlotte, N.C. under the trademark "CELGARD," and the microporous polyethylene polymer material sold by Daramic, Inc. of Lexington, Mass. under the trademark "DARAMIC" in nature, and are electrical insulators containing microporous channels or pathways that allow flow of ions through the material. A requirement for a separator to be used is that it should be well wetted by the electrolyte solution in the electrolysis cell and should be chemically and electrochemically stable.

In aqueous acid solutions, the decomposition of water involves two electrochemical reactions which take place at the positive and negative electrodes. At the positive electrode, water molecules are oxidized, liberating oxygen gas and protons (which transport ionic current in the solution) and electrons which flow through the external circuit and power source to the negative electrode. This electrochemical reaction is represented by Equation [8] and has a standard electrode potential of 1.23 V.

$$2H_2O \rightarrow O_2 + 4H^+ + 4e^-; E°=1.23V(25° C.) \quad \text{Equation (8)}$$

At the negative electrode, the protons recombine with the electrons to liberate hydrogen gas, which is represented by Equation [9] and has a standard reversible potential of 0.00V.

$$4H^+ + 4e^- \rightarrow 2H_2; E°=0.00V(25° C.) \quad \text{Equation (9)}$$

If the nature of the catalytic surface of the positive electrode is changed, a competing electrochemical water oxidation reaction may become more favorable. This competing water oxidation reaction involves the liberation of ozone gas and is represented by Equation [10] which has a reversible potential of 1.51V.

$$3H_2O > O_3 + 6H^+ + 6e^-; E°=1.51V(25° C.) \quad \text{Equation (10)}$$

Based on thermodynamic criteria, it is apparent from Equations [9] and [10] that the minimum cell voltage required to decompose water electrochemically into hydrogen and ozone gases under standard conditions requires a minimum of 1.51V to be applied between the positive and negative electrodes. Due to electrical resistance in the electrolyte solution between the positive and negative electrodes and the overpotentials required in order to make reaction [9] and [10] proceed at significant rates at 25° C., the actual cell voltage will be on the order of 3.0 V.

As a first step to lower this actual cell voltage and, hence, minimize the consumption of electrical energy, the electrodes need to be placed as close as possible to each other. This is greatly facilitated by the use of an ion exchange membrane, such as the proton exchange membrane, which can have thicknesses in the range 50–175 μm (2–7 mils). Use of an ion exchange membrane can yield a so-called "zero gap" between the positive and negative electrodes. It is also advantageous if the ion exchange membrane is a proton-conducting membrane, such perfluorinated sulfonic acid polymer sold by duPont under the trademark "NAFION" 117, which would enable the electrochemical reaction to proceed as described by Equations [9] and [10].

A second step in lowering the cell voltage and, hence, minimizing electrical energy consumption, is to coat the positive and negative electrodes with electrocatalyst layers that speed up the rates of the hydrogen evolution reaction and the ozone formation reaction. It is well known that platinum is the most effective electrocatalyst for hydrogen evolution, particularly in acid solutions, and that lead dioxide is highly effective for the electrochemical formation of ozone from water. However, placing the electrodes as close as possible to each other and using the most effective anodic and cathodic electrocatalysts may lower the cell voltage only a few hundred millivolts.

It is almost impossible using these approaches to reduce the cell voltage for the electrochemical production of ozone from water much below 3.0V. A different result is achieved if the cathodic reduction product is not hydrogen but involves another reaction leading to a different product. Suppose that the hydrogen evolution reaction is replaced by a cathodic reduction reaction taking place at a more positive potential than that at which hydrogen is evolved; then the reversible potential for this reaction would be more favorable and the cell voltage would be reduced. The selection criterion for chemicals that could partake in an alternative cathodic reduction reaction, that is, function as cathodic depolarizers, is that they have a thermodynamic reversible potential more positive than that corresponding to the evolution of hydrogen gas, which is represented by Equation [9]. It is also desirable that these cathodic depolarizers be abundantly available, or readily reoxidizeable, for recycling into the electrolysis cell.

Examples of potential cathodic depolarizers that could be used in an electrolysis cell containing an acidic electrolyte and which could be combined with the anodic oxidation of water, liberating ozone gas, are given in Table 1, including oxygen. As seen from the table, some of these cathodic depolarizers exist in the gas phase, while others are acids or salts and can be exploited only when dissolved in water. All of the cathodic depolarizers identified in Table 1 support high electrochemical reaction rates, that is high current densities at low overpotentials. This is particularly true if these depolarizers are utilized in conjunction with appropriate cathode electrode structures. In the case of the gas-phase cathodie depolarizers, a gas-diffusion electrode would be most suitable. However, for the cathodic depolarizers that can only be used when dissolved in water, flow-by, flow-through, packed-bed and fluidized-bed electrode structures are more advantageous in order to achieve high current densities.

The gaseous-phase cathodic depolarizers could be supplied to the negative electrode under pressure, which would further increase the electrochemical reaction rate, that is, allow even higher current densities to be realized. The use of a proton exchange membrane as the electrolyte greatly facilitates the use of pressure on introducing the cathodic depolarizer into the electrochemical cell, since it will prevent the removal of electrolyte from the cathode chamber, as would occur with a liquid electrolyte solution, and will allow the electrolysis cell to function, even with different pressures in the cathode chamber and in the anode chamber. Furthermore, the ozone product can be delivered out of the cell under pressure suitable for immediate use in pressurized applications. Since the proton exchange membrane also functions as a separator, it prevents transfer of the cathodic depolarizer and its electrochemical reduction products from diffusing or migrating into the anode chamber, where they could interfere with the evolution of ozone gas from water.

The ozone produced by the electrochemical synthesis of the present invention may be utilized either in aqueous solutions directly from the cell or after disengaging the ozone gas from the water. Aqueous ozone may be preferred in such applications as wastewater treatment and purification. The aqueous cell effluent containing solubilized ozone gas is added into a wastewater stream containing organic substances where the ozone gas can

TABLE 1

| Cathodic Depolarizer | Depolarizer Phase | Cathodic Reaction | Reversible Potential at 25° C. | Theoretical Cell Voltage with $O_3$ Evolution as Anodic Reaction |
|---|---|---|---|---|
| Chlorine | Gas Phase | $Cl_2 + 2e^- \rightarrow 2Cl^-$ | 1.36 V | 0.15 V |
| Bromine | Gas Phase | $Br_2 + 2e^- \rightarrow 2Br^-$ | 1.09 V | 0.42 V |
| Chlorine Dioxide | Gas Phase | $ClO_2 + H^+ + e^- \rightarrow HClO_2$ | 1.277V | 0.23 V |
| Dinitrogen Tetroxide | Gas Phase | $N_2O_4 + 4H^+ + 4e^- \rightarrow 2NO + 2H_2O$ | 1.035V | 0.475V |
| Oxygen | Gas Phase | $O_2 + 4H^+ + 4e^- \rightarrow 2H_2O$ | 1.23 V | 0.28 V |
| Air | Gas Phase | $O_2 + 4H^+ + 4e^- \rightarrow 2H_2O$ | 1.23 V | 0.28 V |
| Ferric Chloride | Aqueous Solution | $Fe^{3+} + e^- \rightarrow Fe^{2+}$ | 0.77 V | 0.74 V |
| Benzoquinone | Aqueous Solution | $BQ + 2H^+ + 2e^- \rightarrow HQ$ | 0.70 V | 0.81 V |
| Hypobromous Acid | Aqueous Solution | $HBrO + H^+ + 2e^- \rightarrow Br^- + H_2O$ | 1.33 V | 0.18 V |
| Hypochlorous Acid | Aqueous Solution | $HClO + H^+ + 2e^- \rightarrow Cl^- + H_2O$ | 1.48 V | 0.03 V |
| Sodium Ferricyanide | Aqueous Solution | $[Fe(CN)_6]^{3-} + e^- \rightarrow [Fe(CN)_6]^{4-}$ | 0.36 V | 1.15 V |
| Sodium Nitrate | Aqueous Solution | $NO_3^- + 3H^+ + 2e^- \rightarrow HNO_2 + H_2O$ | 0.93 V | 0.58 V | react with the organic substances. The reaction mechanism, as described above, may optionally be assisted by exposing the ozone-containing wastewater stream to ultraviolet radiation which promotes the formation of hydroxyl and peroxyl radicals. It is preferred that a residual of ozone be maintained in the wastewater stream until immediately prior to use, at which time the ozone should be eliminated from the water. The ozone can be eliminated either by decomposition or disengagement.

Some ozone applications require that the ozone gas be separated from the water and applied in the gas phase. Typically, the ozone gas will be fed to a chamber where the ozone gas can react with a given reactant material. In applications requiring high concentrations of ozone, this chamber may be evacuated of air to avoid dilution of the ozone. Following completion of the reaction, the ozone is eliminated from the chamber and the chamber is filled with air to allow safe handling and removal of sterilized items. Ozone may be eliminated from the chamber by decomposition or by evacuation of the ozone gas. In order to improve the conditions for sterilization or disinfection of biological materials and residues within the chamber, the temperature, pressure and humidity inside the chamber may be controlled. Control of conditions in the chamber is most important where the chamber is a chemical reaction vessel. In a chemical reaction vessel, the ozone will react with other chemical reactants to produce a commercial product rather than the sterilization of biological materials.

The ozone produced by the present invention may be used for numerous applications. One example is the treatment of waste water. Such waste water treatment may be performed with or without the use of ultraviolet light. The ultraviolet light radiation is capable of producing hydroxyl radicals from ozone fed into a waste water stream.

A second application for the ozone of the present invention is the sterilization of medical tools and apparatus. Currently, medical instruments are sterilized in ethylene oxide-containing cabinets where the instruments are exposed to ethylene oxide for a period of 4 to 5 hours. The disadvantages of such systems include the fact that the ethylene oxide is extremely flammable in any concentration when combined with oxygen and is also a carcinogen. In addition, under certain conditions, such as a battlefield, there is insufficient time to allow adequate sterilization of instruments. Therefore, there is a need for quick and efficient sterilization of medical instruments as would be provided by the highly concentrated ozone of the present invention.

Another application of a highly concentrated ozone production of the present invention is in the poultry industry. Present hatching technology proscribes the use of large square boxes in which eggs are incubated and hatched. These boxes become extremely contaminated with organic waste as the chicks break through the shell. Organic material from inside the egg becomes coated on the walls of the box and provides a source of bacterial growth. The concentrated ozone gas of the present invention would provide a means for disinfecting these boxes for reuse in the hatching process.

A particular advantage of the cells according to the present invention is that the ozonizers may be made compact and therefore are useful in such applications as swimming pool sanitization, control of bio-fouling in air conditioning systems, cooling towers, industrial waste treatment applications, i.e., such as phenol, pesticide, cyanide, dye waste, and heavy metals. Further uses include use in bottling and maintaining potable water quality in remote sites, reprocessing aquaria water, odor control or disinfection of sewage. Many of these applications are not currently utilizing ozone due to the high cost of ozonizers heretofore known, the associated cost of air or oxygen preparation and the low concentration of ozone output.

It will be understood that certain combinations and sub-combinations of the invention are of utility and may be employed without reference to other features or sub-combinations. This is contemplated by and is within the scope of the present invention. Many possible embodiments may be made of this invention without departing from the spirit and scope thereof. It is to be understood that all matters herein above set forth or shown in the accompanying drawings are to be interpreted as illustrative and not in any limiting sense.

While the foregoing is directed to the preferred embodiment, the scope thereof is determined by the claims which follow.

What is claimed is:

1. An electrolytic cell for the production of ozone comprising:

an anode comprising a porous sintered substrate and an electronically conducting, hydrophilic, ozone-forming catalyst coating thereon, wherein the substrate is formed by sintering particulate materials selected from the group consisting of titanium, titanium suboxides, platinum, tungsten, tantalum, hafnium and niobium, and wherein the catalyst coating comprises a catalyst selected from the group consisting of lead dioxide, platinum-tungsten alloys and mixtures, glassy carbon and platinum;

a gas diffusion cathode comprising a polytetrafluoroethylene-bonded, semi-hydrophobic catalyst layer comprised of a proton exchange polymer and a metal selected from the group consisting of platinum, palladium, gold, iridium, nickel and mixtures thereof, supported on a hydrophobic gas diffusion layer comprising carbon cloth or carbon paper fiber impregnated with a sintered mass derived from fine carbon powder and a polytetrafluoroethylene emulsion; and a proton exchange membrane having a first side bonded to the catalyst layer of the gas diffusion cathode and a second side in contact with the anodic catalyst coating.

2. The electrolytic cell of claim 1 wherein the catalyst coating on the substrate of the gas diffusion cathode is comprised of platinum.

3. The electrolytic cell of claim 1 wherein the catalyst coating on the metal substrate of the anode is comprised of porous titanium.

4. The electrolytic cell of claim 1 wherein the proton exchange membrane is comprised of a perfluorinated sulfonic acid polymer.

5. The electrolytic cell of claim 1 wherein the catalyst coating on the metal substrate of the anode and the catalyst layer of the gas diffusion cathode further comprise a perfluorinated sulphonic acid polymer.

6. The electrolytic cell of claim 1 wherein the metal substrate of the anode is coated with a thin layer of a noble metal selected from the group consisting of platinum, gold, iridium and palladium, and wherein the layer of noble metal is coated with the anodic catalyst coating.

7. The electrolytic cell of claim 1 wherein the metal substrate of the anode is coated with lead dioxide.

8. An apparatus for the electrolytic generation of ozone comprising:

(a) a plurality of individual electrolytic cells having;

(i) an anode comprising a smooth, flat, rigid porous sintered substrate and a catalyst coating, wherein the substrate is formed by sintering particulate materials selected from the group consisting of porous titanium, titanium suboxides, platinum, tungsten, tantalum, hafnium and niobium, and wherein the catalyst coating is selected from the group consisting of lead dioxide, platinum-tungsten alloys and mixtures, glassy carbon and platinum;

(ii) a gas diffusion cathode comprising a polytetrafluoroethylene-bonded, semi-hydrophobic catalyst layer supported on a hydrophobic gas diffusion layer, wherein the catalyst layer is comprised of a proton exchange polymer, polytetrafluorethylene polymer and a metal selected from the group consisting of platinum, palladium, gold, iridium, nickel and mixtures thereof, and wherein the gas diffusion layer has a carbon cloth or carbon paper fiber impregnated with a sintered mass derived from fine carbon powder and a polytetrafluoroethylene emulsion;

(iii) a proton exchange membrane having a first side bonded to the catalyst layer of the gas diffusion cathode and a second side in contact with the anodic catalyst coating;

(iv) a first electrically insulating, chemically resistant gasket disposed around the edge of the anode having sections removed for internal manifolding to allow fluid flow to and from the anode;

(v) a second electrically insulating, chemically resistant gasket disposed around the gas diffusion cathode having sections removed for internal manifolding to allow fluid flow to and from the cathode;

(vi) a first expanded metal sheet communicating electrically with the anode and facilitating fluid flow over the complete surface of the anode; and (vii) a second expanded metal sheet communicating electrically with the cathode and facilitating fluid flow over the complete surface of the cathode;

(b) wherein each of the individual electrolytic cells are positioned in a filter-press arrangement and connected in a series electrical circuit;

(c) a fluid impervious bipolar plate selected from the group consisting of dense titanium, tantalum, hafnium, zirconium, stainless steels, and other high chromium/nickel-containing alloys disposed between each of the individual electrolytic cells, wherein said bipolar plate has a first side in electrical contact with the first expanded metal sheet of a first adjacent cell and a second side in electrical contact with the second expanded metal sheet of a second adjacent cell;

(d) first and second end plates having electrical connection means, an oxygen gas or air inlet port, a water inlet port, a cathode product outlet port and an anode product outlet port; and (e) clamping means for securing the end plates and electrolytic cells tightly together.

9. The apparatus of claim 8 further comprising means for electrically isolating the first end plate from the second end plate.

10. The electrolytic cell of claim 8 wherein the metal substrate of the anode is coated with a thin layer of a noble metal selected from the group consisting of platinum, gold, iridium and palladium, and wherein the layer of noble metal is coated with the anodic catalyst material.

* * * * *

UNITED STATES PATENT AND TRADEMARK OFFICE
CERTIFICATE OF CORRECTION

PATENT NO. : 5,460,705
DATED : October 24, 1995
INVENTOR(S) : Oliver J. Murphy and G. Duncan Hitchens It is certified that error appears in the above-indentified patent and that said Letters Patent is hereby corrected as shown below:

Column 1, 1st paragraph, change paragraph to read --This invention was made with Government support under the following contracts or grants: NAS9-18317 and NAS9-18505 awarded by NASA; F08635-91-C-0204 and F08635-92-C-0086 awarded by the Air Force; N00024-91-C-4067 awarded by the Navy; and 93-33610-8460 awarded by the United States Department of Agriculture. The Government has certain rights in this invention.--

Column 2, line 20, change "$O_2/O3$" to --$O_2/O_3$--

Column 3, line 52, change "$\leq$" to -- $\geq$ --.

Column 4, line 48, delete "to oxygen".

Column 5, lines 31 and 32, after the letter "C" delete ".".

Column 6, line 59, change "perfluoronated" to --perfluorinated--

Column 7, lines 36, change "perfluoronated" to --perfluorinated--

Column 9, lines 56, 57 and 64, after the letter C delete ".".

Column 10, line 34, after the letter C delete ".".

Column 12, line 40, change "m" to --M--

Column 14, line 66, after "FIG. 2" insert --is--.

Column 15, line 18, delete "the" and insert --this--.
 line 37, after "gold" insert --,--.
 line 39, please change "delivered" to --Water is delivered--.

Column 16, line 8 after "from", insert --a--.

Column 19, line 10, change "electrosmotically" to --electroosmotically--

UNITED STATES PATENT AND TRADEMARK OFFICE
CERTIFICATE OF CORRECTION

PATENT NO. : 5,460,705
DATED : October 24, 1995
INVENTOR(S) : Oliver J. Murphy and G. Duncan Hitchens It is certified that error appears in the above-indentified patent and that said Letters Patent is hereby corrected as shown below:

Column 21, line 6, after "such" please insert --as the--
Column 21, line 9, change "reaction" to --reactions--.
Column 22, line 10, change "catbodie to --cathodic--.

Signed and Sealed this

Fifth Day of November, 1996

Attest:

BRUCE LEHMAN

Attesting Officer

Commissioner of Patents and Trademarks